A. D. ROBBINS.
FLEXIBLE STUFFING BOX.
APPLICATION FILED JULY 15, 1912.
1,063,389. Patented June 3, 1913.
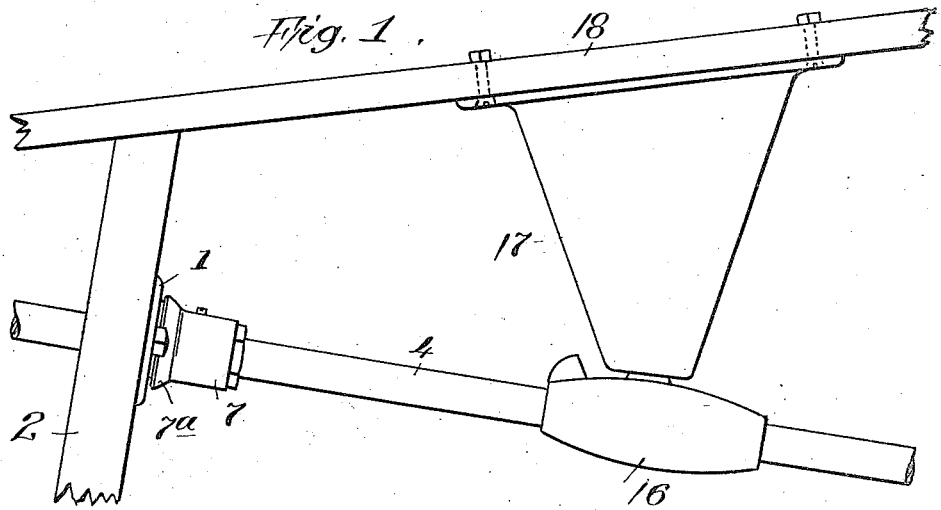
Fig. 1.
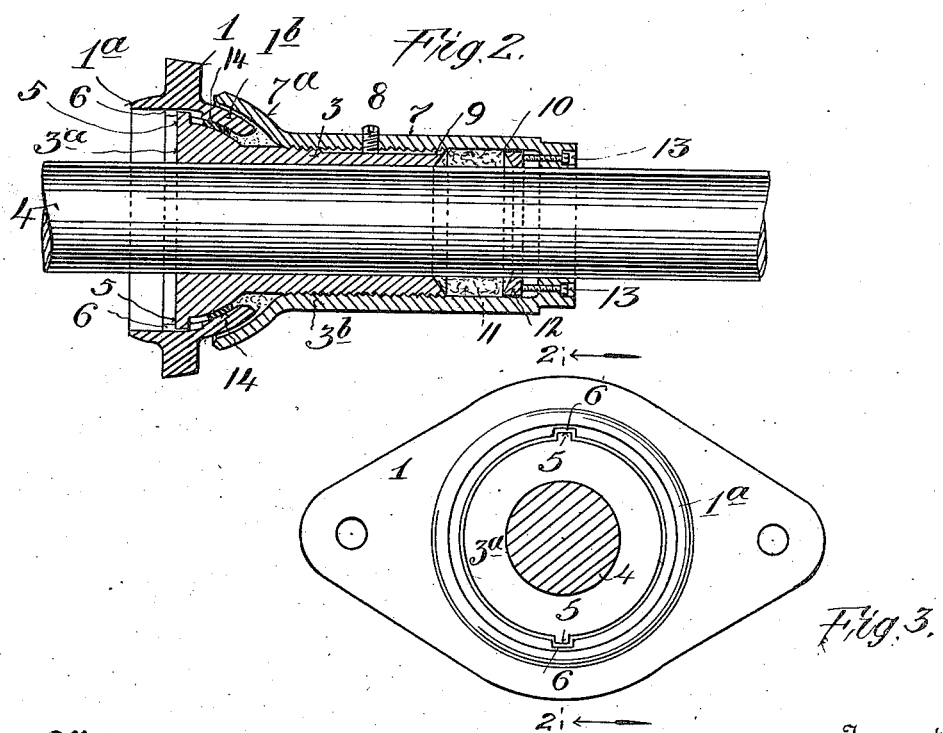
Fig. 2.
Fig. 3.
Witnesses:
Inventor
A. D. Robbins,
By his Attorney

UNITED STATES PATENT OFFICE.

ALFONZO D. ROBBINS, OF FREEPORT, NEW YORK.

FLEXIBLE STUFFING-BOX.

1,063,389.  Specification of Letters Patent.  Patented June 3, 1913.

Application filed July 15, 1912. Serial No. 709,521.

*To all whom it may concern:*

Be it known that I, ALFONZO D. ROBBINS, a citizen of the United States, and resident of Freeport, in the county of Nassau and State of New York, have invented certain new and useful Improvement in Flexible Stuffing-Boxes, of which the following is a specification.

My invention relates to improvements in flexible stuffing boxes, and has special reference to its use in connection with propeller shafts for boats.

The object of my invention is to provide an improved stuffing box enabling the shaft passing through the same to aline with the driving shaft or its bearings according to angular relation of the shafts with respect to each other, the flexible stuffing box having movement to relieve its shaft from strain and friction.

My invention comprises novel details of improvement and combination of parts that will be more fully hereinafter set forth and then pointed out in the claims.

Reference is to be had to the accompanying drawings forming part hereof, wherein, Figure 1 is a side view illustrating my improvements applied in a boat; Fig. 2 is a central section of my improved flexible stuffing box substantially on the line 2, 2, in Fig. 3, and Fig. 3 is a face view thereof looking from the left in Fig. 2.

In the drawings the numeral 1 indicates a flange or plate having suitable apertures for attachment to the deadwood or other part 2 of a boat, or other support, in a well known manner. Flange 1 is shown provided with a collar or annulus 1$^a$ adapted to be seated in a suitable recess or opening in part 2. Said flange or plate is shown provided, on the side opposite said collar 1$^a$, with a spherically disposed hollow seat 1$^b$ receiving a correspondingly disposed ball-like head 3$^a$ on a sleeve 3 projecting through and beyond the seat 1$^b$. Sleeve 3 is shown exteriorly threaded at 3$^b$, and is bored internally as a bearing for shaft 4. The head or half-sphere 3$^a$ is provided with lugs 5 which fit into slots or recesses 6 in flange or plate 1, whereby head 3$^a$ and sleeve 3 may have angular movement relative to flange 1, but are retained from rotation by the slots 6 and lugs 5.

Upon sleeve 3 is a cap or sleeve 7 shown provided with internal threads meshing with the threads 3$^b$, said cap or sleeve having at its inner end a partially spherically-shaped jaw 7$^a$ fitting over the seat 1$^b$. Cap or sleeve 7 is shown provided with a set screw 8 adapted to enter a slot 9 in sleeve 3 to retain said parts from rotation with respect to each other after the desired adjustment of said parts has been made. A gland 10 containing packing 11 is provided between the outer portions of sleeve 3 and cap 7, and within cap 7 is shown a packing ring 12 adapted to be forced inwardly against packing 11 by screws 13 threaded in the end of cap 7. Between the opposed faces of head 3$^a$ and seat 1$^b$ is suitable packing 14, and by adjusting jaw 7$^a$ against seat 10$^b$ the packing 14 will be firmly clamped in position, and yet the parts 3 and 7 may have movement relatively to flange 1 and its seat 1$^b$. Packing 15 may also be placed between seat 1$^b$ and jaw 7$^a$ to further insure against leakage. Shaft 4 is shown supported by a stuffing box 16 supported by strut 17 from the fashion plate 18, or other part of the boat.

With the parts assembled, as shown in Fig. 2, upon shaft 4, and flange 1 secured in position against the deadwood or support 2, the flexible stuffing box will be securely yet movably retained in position but against rotation, and the shaft 4 may be caused to properly aline with the driving shaft in the boat. The flexible stuffing box will be enabled to move relatively to flange 1, as may be required, to permit shaft 4 to rotate freely and without binding in the stuffing box, since the latter may accommodate itself to varying positions assumed by said shaft.

My improvements are simple and cheap to manufacture, efficient in operation, and are capable of being applied without requiring mechanical skill, hence are adapted for the use of owners of small motor boats, as well as others.

I am aware that a stuffing box with ball and socket connections is well known, hence I do not broadly claim the same, nor do I limit my invention to the details of construction shown and described, as the same may be varied, within the scope of the appended claims, without departing from the spirit of my invention.

Having now described my invention what I claim is:—

1. A flexible stuffing box comprising a seat, a partially spherical head within said seat, a lug and slot connection between said head and seat to permit said head to rock without rotation, and a cap secured to said head and receiving said seat.

2. A flexible stuffing box comprising a seat, a partially spherical head within said seat, a lug and slot connection between said head and seat to permit said head to rock without rotation, and a cap secured to said head and receiving said seat, and packing within the cap to fit upon a shaft.

3. A flexible stuffing box comprising a flange having a spherically disposed seat and a slot, a sleeve having a head within said seat and provided with a lug entering said slot to permit said head to rock without rotation, a cap upon said sleeve and provided with a jaw receiving said seat, and means for securing said cap upon said sleeve.

4. A flexible stuffing box comprising a flange having a spherically disposed seat and a slot, a sleeve having a head within said seat and provided with a lug entering said slot to permit said head to rock without rotation, a cap upon said sleeve and provided with a jaw receiving said seat, means for securing said cap upon said sleeve, said cap having an interior packing ring, and means for forcing said ring toward said sleeve.

5. A flexible stuffing box comprising a flange having a collar projecting from one side and a spherically disposed seat extending from the other side, said flange having an interior slot, a sleeve having a head fitted within said seat and provided with a lug entering said slot, a cap upon said sleeve having a jaw receiving said seat, and means for securing said cap in adjusted position upon said sleeve.

6. A flexible stuffing box comprising a flange having a collar projecting from one side and a spherically disposed seat extending from the other side, said flange having an interior slot, a sleeve having a head fitted within said seat and provided with a lug entering said slot, a cap upon said sleeve having a jaw receiving said seat, said sleeve having exterior threads, said cap having interior threads meshing with the first named threads for adjusting said cap upon said sleeve, and means for securing said sleeve and cap from relative rotation.

7. A flexible stuffing box comprising a seat, a partially spherical head within said seat, means to permit said head to move relatively to said seat but without rotation, and a cap secured to said head and receiving said seat.

8. A flexible stuffing box comprising a spherically disposed seat, a partially spherical head within said seat, means to permit said head to move relatively to said seat without rotation, a sleeve extending from said head and having a bore to receive a shaft, a cap upon said sleeve having a jaw receiving said seat, and means to retain said cap upon said sleeve in adjusted position.

9. A flexible stuffing box comprising a seat, a head having a spherical portion within said seat, a cap having a jaw receiving said seat, and means for detachably connecting said head and cap, whereby the latter may have movement with respect to the seat interposed between them.

10. A flexible stuffing box comprising a spherically disposed seat, a sleeve having a spherically disposed head within said seat, a cap upon said sleeve having a spherically disposed jaw receiving said seat, and means to retain said cap upon said sleeve in adjusted position, whereby the head and jaw may have movement relatively to said seat.

Signed at New York city in the county of New York and State of New York this 19th day of June A. D. 1912.

ALFONZO D. ROBBINS.

Witnesses:
WESTMINSTER ABBEY,
ALEXANDER T. QUINN.

---

Copies of this patent may be obtained for five cents each, by addressing the "Commissioner of Patents, Washington, D. C."